July 7, 1959 W. F. ROCKWELL 2,893,520
AIR SPRING EMERGENCY BRAKE

Filed May 22, 1956 2 Sheets-Sheet 1

INVENTOR
WILLARD F. ROCKWELL

BY *Strauch, Nolan & Neale*

ATTORNEYS

July 7, 1959 W. F. ROCKWELL 2,893,520
AIR SPRING EMERGENCY BRAKE
Filed May 22, 1956 2 Sheets-Sheet 2
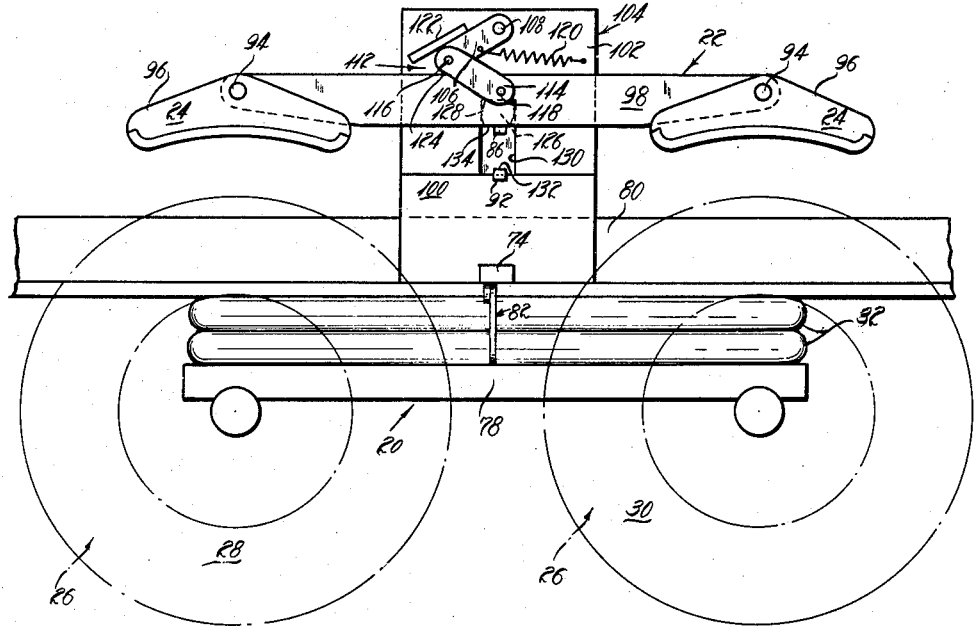
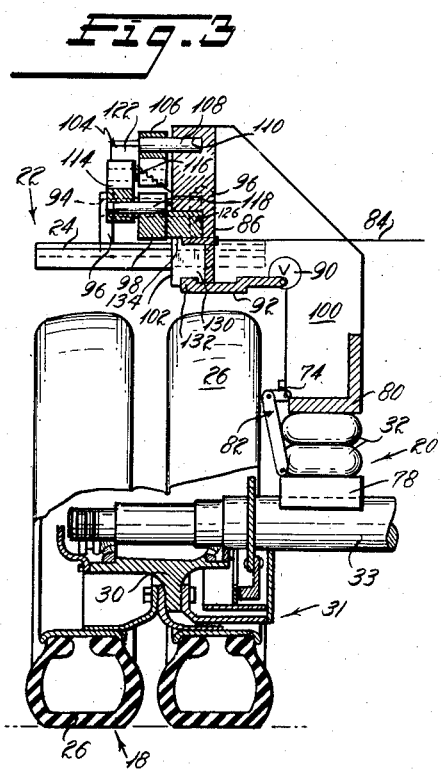
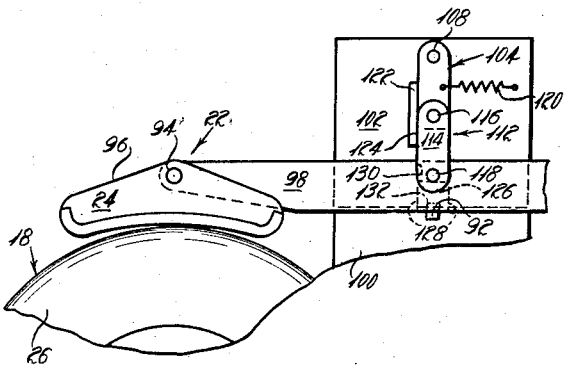
INVENTOR
WILLARD F. ROCKWELL
BY Strauch, Nolan & Neale
ATTORNEYS United States Patent Office 2,893,520
Patented July 7, 1959

2,893,520
AIR SPRING EMERGENCY BRAKE

Willard F. Rockwell, Pittsburgh, Pa., assignor to "Rockwell-Standard Corporation," a corporation of Pennsylvania Application May 22, 1956, Serial No. 586,603

6 Claims. (Cl. 188—176)

This invention relates to improvements in vehicle brake systems and has particular reference to an emergency brake system for use in an air brake equipped vehicle having air springs to arrest movement of the vehicle in the event of operating failure of the air brake system.

Air springs are being used more and more in replacing steel springs for such applications as industrial trailers, buses, passenger cars and heavy military vehicles. The present invention provides, in association with such a vehicle suspension, an auxiliary emergency brake system wherein, in the event of failure of the primary brake system, air may be dumped from the air springs in order that the weight of the vehicle will bring brake shoes into engagement with and to press the shoes against tire peripheries of the ground engaging wheels of the vehicle to arrest vehicle movement.

The principal objects of the present invention are to provide in a pneumatic suspension equipped automotive vehicle:

(1) An auxiliary brake for emergency use in the event of operating failure of the primary vehicle braking system;

(2) An auxiliary brake for emergency use in the event of operating failure of the primary vehicle braking system embodying brake shoes which are moved into operating position to apply a braking force to the vehicle wheels under control of the air pressure within the pneumatic suspension system;

(3) An auxiliary brake for emergency use in the event of vehicle primary braking system operating failure embodying brake shoes which may be brought into braking engagement with the tires of the vehicle's ground engaging wheels;

(4) An auxiliary brake for emergency use in the event of vehicle primary braking system operating failure in which the weight of the vehicle frame and load is utilized to apply a braking force to the vehicle's ground engaging wheels;

(5) An auxiliary brake for emergency use in the event of vehicle primary braking system operating failure embodying brake shoes mounted on the vehicle frame for movement under selective operator control from an inoperable position to an operable position above and closely adjacent the vehicle tires and a mechanism for automatically effecting exhaust of air from the pneumatic suspension when such shoes are moved to their operable position to effect engagement between the brake shoes and the vehicle tires under the force of the weight of the vehicle body and load.

Further objects of the present invention will become apparent from the following description, when considered in connection with the accompanying drawings and the appended claims.

In the drawings which illustrate several simple and practical embodiments of the invention:

Figure 3 is an end view partially broken away and detailed of the tandem axle unit and emergency brake means shown in Figure 2.

Figure 4 is a partial side view of the tandem axle and emergency brake means of Figure 2 with the shoe support means dropped into position with the shoes in close proximity to the tire peripheries.

Figure 5 is a partial schematic layout of the vehicle air system and the control means for the air spring emergency brakes.

Figure 1:
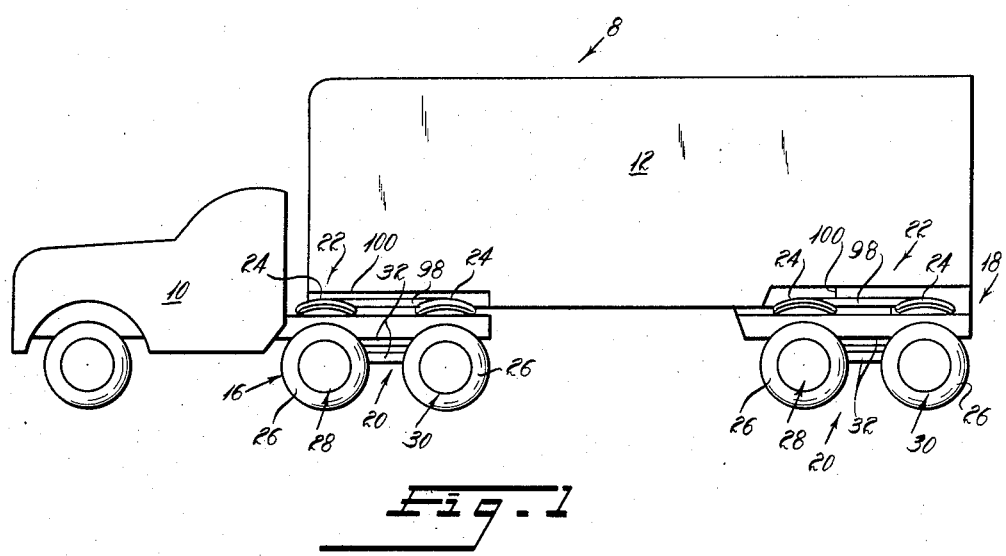
Figure 1 is a side view of a tractor trailer rig which uses my new improved air spring emergency brake.

With reference to the drawings particularly Figure 1, a vehicle 8 comprising an engine driven tractor unit 10 and a trailer unit 12 is shown to have a tandem drive axle unit 16 at the rear of the tractor 10 and a tandem trailer axle unit 18 at the rear of the trailer 12 both of which are equipped at their opposite ends with air spring suspensions 20, of conventional construction, and with air spring actuated emergency brake means 22. Each emergency brake means 22 has brake shoes 24 which are brought into and maintained in braking engagement with the peripheries of pneumatic tires 26 of forward wheels 28 and of rear wheels 30 of tandem axle units 16 and 18 by the weight of the vehicle as air is dumped from air bags 32 in air spring suspensions 20. Figure 3 illustrates wheel 30 as being a dual wheel equipped with a conventional internally expanding brake mechanism 31 and rotatably mounted on a trailer axle 33.

In the vehicle air system (see Figure 5) compressor 34 supplies air under pressure through line 36 to wet tank 38. Line 40 connects wet tank 38 to dry tank 44. An air line 46 extends from dry tank 44 to governor 48 which acts, dependent upon the air pressure within dry tank 44, to regulate compressor 34 through line 50 between governor 48 and compressor 34. Branch 52 of air line 46 extends to air gauge 54 and a low pressure alarm 56 in the vehicle cab.

Figure 2:
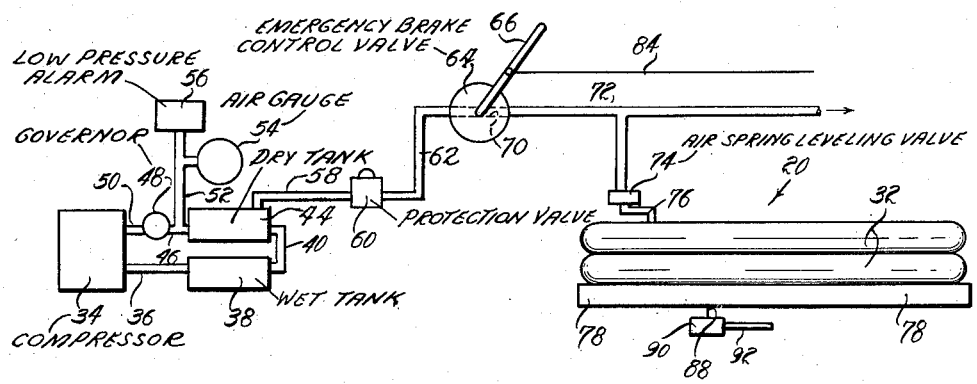
Figure 2 is a side view of tandem axles with the air spring emergency brake used in the vehicle of Figure 1.

Air line 58 extends from dry tank 44 to pressure protection valve 60 which allows air flow only when air in tank 44 is above a predetermined pressure and, when air in tank 44 is below that predetermined pressure, valve 60 will not permit air flow in either direction. Air line 62 extends from valve 60 to air spring emergency brake control valve 64 which is normally left with manual control lever 66 in the normal control setting as illustrated. Control lever 66 and control valve 64 may be located at any position within the cab convenient to the operator. Control valve 64 has a rotatable core 68 with a through opening 70 which permits through passage of air from line 62 to line system 72 when set in the normal control setting, and, when turned to the emergency braking setting, shuts off line system 72 from the air in line 62. Air line system 72 extends in parallel relation from control valve 64 through the air spring leveling valves 74 and air lines 76 to respective air spring reservoirs 78 associated with each air spring suspension 20. Leveling valves 74, which are mounted on vehicle frame longitudinal members 80, are each connected in fluid communication with the respective reservoirs 78 of axle units 16 and 18 by valve actuating cranks linkage assemblies 82 (Figures 2 and 3). These valve crank linkage assemblies 82 operate leveling valves 74 to add air to, or exhaust air from the respective air spring reservoirs 78 so that respective air spring bags 32 will maintain proper predetermined spacing of reservoirs 78 and axle units 16 and 18 with respect to vehicle frame longitudinal members 80.

Wires 84, which extend from manual lever 66 (Figure 5) to emergency brake latch release members 86 (Figures 2 and 3) are effective to pull each latch member 86 when lever 66 is thrown from the normal control setting to the emergency braking setting to release the emergency brake means 22 to move from the position of Figure 2 to the position of Figure 4 as will be explained more fully presently. An air line 88 (Figure 5) extends from each air spring reservoir 78 and the respective air spring bags 32 to an air dump valve 90. Each air dump valve 90 has an actuatnig arm 92 which actuates the valve 90 to dump air from the associated reservoir 78 and the air spring bags 32.

While the emergency brake means 22 is disclosed in and will be described in detail in reference to Figures 2, 3 and 4 showing the tandem trailer axle unit 18, it is to be understood that this description in all material respects is equally applicable to the brake means 22 associated with the tandem drive axle unit 16.

Shoes 24 are pivotally mounted by transversely extending rods 94, which extend between the spaced parallel shoe webs 96 (Figure 3) on shoe 24, on each end of a longitudinally extending shoe mounting arm 98. Brake shoes 24 are normally positioned above and are movable into braking engagement with the top of the outer periphery of tires 26 of each of the dual wheels 28 and 30 at each end of the tandem axle unit 18.

Each shoe mounting arm 98 is movably mounted on a mounting bracket 100 which is fixed, as by welding, to vehicle frame longitudinal member 80. Mounting bracket 100 extends upwardly and outwardly from member 80 over the center of the tandem axle assembly and terminates in a vertical mounting and guide face 102. Shoe mounting arm 98 is mounted on face 102 by a jack-knife-like linkage 104. Linkage 104 includes a link 106 pivotally mounted at one end to face 102 by pin 108 which projects into opening 110 in bracket 100. At the other end, link 106 is pivotally connected in a knee joint 112 to one end of link 114 by pivot pin 116. The other end of link 114 is pivotally connected to shoe mounting arm 98 by a pivot pin 118.

A tension spring 120 extends from each mounting face 102 to link 106 and constantly biases the respective linkage assemblies 104 from the drawn up knee bent position of Figures 2 and 3 to the dropped straightened position of Figure 4. Flange 122 on link 106 comes into contact with surface 124 of link 114 to prevent spring 120 pulling knee joint 112 any further from the position of Figure 2 than the position shown in Figure 4. In the position of Figure 4, the axis of pivot pin 116 is slightly to the right of the dead center position between the axes of pins 108 and 118 so that, when a load is applied between pins 108 and 118, there is no tendency for the linkage 104 to collapse to the condition of Figure 2.

A block 126, having rounded ends 128, is fixed to and projects from shoe mounting arm 98 into a vertical guide slot 130 in bracket 100 in order to transmit to bracket 100 the longitudinal thrust imparted to shoes 24 and arm 98 when shoes 24 engage tires 26 to thereby prevent longitudinal movement of shoes 24 and arm 98. Rounded ends 128 of block 126 permit rocking of each arm 98 for balanced application of shoes 24 to the tires 26 of tandem axles 28 and 30. An actuating arm 92 of the air dump valve 90, which is mounted on bracket 100, projects into the bottom of guide slot 130 of the bracket 100 where the end pad 132 of arm 92 is in position to be contacted and moved by the bottom 134 of block 126 as shoe mounting arm 98 is dropped from the high position of Figure 2 to the low position of Figure 4.

The shoe mounting arm 98 is held in the high position of Figure 2 by the emergency brake latch release member 86 which is mounted on bracket 100 and projects from bracket 100 into guide slot 130 beneath the bottom 134 of the arm block 126 until pulled by the respective wire 84. In the high position of Figures 2 and 3, shoe mounting arm 98 and shoes 24 are spaced sufficiently above tires 26 to prevent engagement between shoes 24 and the tops of tires 26 during articulation of the tandem axle unit as the vehicle moves. In the low position of Figure 4 shoe mounting arm 98 has been dropped to bring the shoes 24 into close proximity to the tops of tires 26.

In operation, when the vehicle operator throws the manual control lever 66 from the normal to the emergency position, the air supply to air spring reservoirs 78 and air spring bags 32 is cut off and the emergency brake latch release members 86 are pulled inwardly from beneath the blocks 126 to release arms 98. Shoe mounting arm 98 and shoes 24 then fall under the influence of gravity and spring 120 from the high position of Figure 2 to the low position of Figure 4. As shoe mounting arm 98 is in the final stage of dropping into the position of Figure 4, arm block 126 comes into contact with and depresses pad 132 and actuating arm 92 to actuate air dump valve 90. Actuation of valves 90 exhausts air from the associated air spring reservoirs 78 and air spring bags 32 so that the weight of the vehicle and load 14 will lower vehicle frame longitudinal members 80 with respect to reservoirs 78 and tandem axle units 16 and 18. This brings shoes 24 into engagement with the tops of tires 26 with the vehicle weight transmitted through linkage assemblies 104, when straightened as in Figure 4, and mounting arms 98 to shoes 24 to insure adequate braking engagement between shoes 24 and tires 26.

From the foregoing it is apparent that there is hereby provided a new improved emergency brake system used in a vehicle with air springs. It provides an emergency brake system wherein air is dumped from the air springs to utilize the weight of the vehicle to bring brake shoes into braking engagement with and to press the shoes down on the tops of the vehicle tires. It provides a single control lever in the vehicle cab which, when thrown for emergency braking, triggers a series of operations which bring shoes into braking engagement with the tops of the vehicle tires. Means are provided for dropping the emergency brake shoes from a high clearance position to a position in close proximity to the tops of the tires before air is dumped from the air springs.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is to be claimed and desired to be secured by United States Letters Patent is:

1. In an automotive vehicle, a tandem axle assembly supported at its outer ends by ground engaging wheels, a vehicle frame, a pneumatic suspension operatively interconnected between said frame and axle assembly and supporting said frame upon said axle assembly, a longitudinally extending brake shoe support mounted on said frame at each side thereof above the fore and aft wheels of said assembly, a brake shoe pivotly mounted on each said support adjacent each of said wheels, means mounting each of said supports on said frame for movement between first positions in which said shoes are supported thereby in spaced relation from said wheels so as to prevent engagement between said shoes and the wheel peripheries during normal articulation of said axle assembly relative to said frame and second positions in which said shoes are closely adjacent the top of the peripheries of the respective ones of said wheels, means resiliently biasing said supports from their said first toward said second positions, latch means for retaining said supports in said first positions in opposition to said biasing means, manually controlled means for releasing said latch means to permit simultaneous movement of said supports to their said second positions under the influence of said biasing means, and means including an actuator disposed in the path of movement of each of said supports from said first to said second positions and rendered operative upon movement of said supports to said second position for exhausting air from said pneumatic suspensions to effect braking engagement between said shoes and the respective ones of said wheels under the influence of the weight of said vehicle frame.

2. In combination with a vehicle having a frame, an axle assembly disposed beneath said frame, air spring suspension means operatively connected between said frame and said axle assembly, tired wheel assemblies rotatably mounted on the outer ends of said axle assembly at each side of said frame, an emergency brake shoe mounted above and movable into and out of braking engagement with the tops of each of said wheel tires, means so mounting said shoes on said frame that when air is released from said air spring suspension means and said vehicle frame sinks relative to said axle units under its weight each of said shoes is engaged with the top of the associated one of said tires and the weight of said vehicle is transferred from said air suspension means directly to said tires through said brake shoes, said shoe mounting means including means mounting said shoes on said frame for relative movement between first positions remote from the path of articulation of said wheels relative to said frame and second positions adjacent the periphery of the respective ones of said wheels at the top thereof and selectively actuate means for shifting said shoes simultaneously from said first to said second positions, and means including an actuator disposed in the path of movement of said shifting means and rendered operative upon movement of said shoes to their said second positions for exhausting air from said air suspension means when said shoes are in said second positions to permit said frame to sink relative to said axle under the weight of said vehicle to bring said shoes into braking engagement with the periphery of the respective ones of said wheels, said air spring suspension means comprising air spring bellows and an air reservoir at each side of said axle assembly, a leveling valve individual to each said bellows and reservoir, control means for actuating said leveling valve to add or exhaust air from the respective air spring bellows and air reservoir to maintain proper axle unit to frame spacing at the respective sides of said frame and air supply means connected to said air reservoirs.

3. The vehicle defined in claim 2 wherein said axle assembly is a tandem axle assembly and wherein said shoe mounting means comprises at each side of said axle assembly an emergency brake mounting bracket fixed to the vehicle frame, a longitudinally extending shoe mounting arm, one of said shoes being mounted on each end of said shoe mounting arm above the fore and aft wheels of said axle unit, a pivoted linkage mounting said shoe mounting arm on said bracket for movement between a high position with said linkage assembly partially collapsed and a low dropped position with said linkage assembly straightened, a spring connected between said bracket and said linkage biasing said linkage assembly from its partially collapsed to its straightened position, means for retaining said linkage in its straightened position, a latch normally retaining said shoe mounting arm in its upper position, selectively actuate means for releasing said latch to permit movement of said shoe mounting arm from said high to said low position, said shoes being so spaced from said tires as to provide a clearance from said tires for axle unit articulation when said shoe mounting arm is in said high position, said shoes being in close proximity to said tires when said shoe mounting arm is in said low position whereby engagement between said wheel and said brake shoes when said brake shoe mounting arm is in said high position is precluded and whereby said shoes may be brought into braking engagement with the periphery of said wheels when said brake shoe mounting arm is in said low position by exhausting fluid from said suspension means.

4. The vehicle defined in claim 3 wherein said air exhausting means comprises an air dump valve for each of said air suspension reservoir and bellows, said valve having an actuating arm positioned to be moved and held in the actuated state by said shoe mounting arm as the shoe mounting arm drops into said low position.

5. In the vehicle defined in claim 2 wherein said brake shoe actuation initiating means comprises a manually controlled valve having a normal control setting and an emergency brake setting, said valve being open from said air supply means for air supply to said air spring suspension reservoirs and bellows when in the normal control setting and said valve being closed to prevent air supply to the air spring suspension from said air supply means when in said emergency brake setting, and wherein said latch releasing means is connected for actuation simultaneously with the movement of said manually controlled valve to its emergency brake setting.

6. In an automotive vehicle, an axle assembly supported at its outer ends by ground engaging wheels, a vehicle frame, a pneumatic suspension operatively interconnected between said frame and said axle assembly and supporting said frame upon said axle assembly, a brake shoe support on said frame at each side thereof above the associated wheels of said assembly, a brake shoe pivotally mounted on each said support adjacent the respective wheels, means mounting each of said supports on said frame for movement between first positions in which said shoes are supported thereby in spaced relation from said wheels so as to prevent engagement between said shoes and the wheels during normal articulation of said axle assembly relative to said frame and second positions in which said shoes are closely adjacent the respective ones of said wheels, means resiliently biasing said supports from their said first toward their said second positions, means for retaining said supports in their said first positions in opposition to said biasing means, manually controlled means for releasing said last named means to permit simultaneous movement of said supports to their said second positions under the influence of said biasing means, and means including an actuator disposed in the path of movement of said each of said supports from said first to said second positions and rendered operative upon movement of said supports to their said second position for exhausting air from said pneumatic suspension to effect braking engagement between said shoes and the respective ones of said wheels under the influence of the weight of said vehicle frame.

References Cited in the file of this patent

UNITED STATES PATENTS

| | | |
|---|---|---|
| 256,018 | Mallinckrodt | Apr. 4, 1882 |
| 491,664 | Roberts et al. | Feb. 14, 1893 |
| 2,150,576 | Bell | Mar. 14, 1939 |
| 2,710,074 | Simpson | June 7, 1955 |
| 2,742,301 | Pointer | Apr. 17, 1956 |
| 2,759,550 | Moorehead | Aug. 21, 1956 |
| 2,775,314 | Hiemstra | Dec. 25, 1956 |
| 2,777,546 | Kelley | Jan. 15, 1957 |

UNITED STATES PATENT OFFICE

CERTIFICATE OF CORRECTION

Patent No. 2,893,520                        July 7, 1959

Willard F. Rockwell

It is hereby certified that error appears in the printed specification of the above numbered patent requiring correction and that the said Letters Patent should read as corrected below.

Column 2, line 59, after "axle" insert -- units --; line 60, after "18" insert -- and mechanically connected to axle units 16 and 18 --; column 3, line 6, for "actuatnig" read -- actuating --.

Signed and sealed this 16th day of February 1960.

(SEAL)
Attest:

KARL H. AXLINE
Attesting Officer

ROBERT C. WATSON
Commissioner of Patents